United States Patent
Murakami

(10) Patent No.: US 8,762,673 B2
(45) Date of Patent: Jun. 24, 2014

(54) INTERLEAVING DATA ACROSS CORRESPONDING STORAGE GROUPS

(75) Inventor: Hiroshi Murakami, Kawasaki (JP)

(73) Assignee: Fujitsu Limited, Kawasaki-Shi (JP)

( * ) Notice: Subject to any disclaimer, the term of this patent is extended or adjusted under 35 U.S.C. 154(b) by 75 days.

(21) Appl. No.: 13/240,255

(22) Filed: Sep. 22, 2011

(65) Prior Publication Data

US 2012/0011332 A1    Jan. 12, 2012

Related U.S. Application Data

(63) Continuation of application No. PCT/JP2009/001381, filed on Mar. 27, 2009.

(51) Int. Cl.
*G06F 12/06* (2006.01)

(52) U.S. Cl.
CPC ........ *G06F 12/0607* (2013.01); *G06F 12/0615* (2013.01)
USPC ....................................................... 711/165

(58) Field of Classification Search
CPC ............ G06F 12/0607; G06F 12/0615; G06F 2212/262
USPC .............................. 711/154, 165, 202, E12.04
See application file for complete search history.

(56) References Cited

U.S. PATENT DOCUMENTS

| | | | |
|---|---|---|---|
| 5,787,464 A | 7/1998 | Yoshizawa et al. | |
| 7,130,229 B2 | 10/2006 | Dahlen et al. | |
| 2004/0133743 A1* | 7/2004 | Ito et al. | 711/114 |
| 2005/0027951 A1* | 2/2005 | Piccirillo et al. | 711/154 |
| 2005/0102551 A1* | 5/2005 | Watanabe | 714/5 |
| 2006/0187739 A1* | 8/2006 | Borkenhagen et al. | 365/230.05 |
| 2006/0288177 A1* | 12/2006 | Shaw | 711/162 |
| 2007/0050544 A1* | 3/2007 | Chawla et al. | 711/114 |
| 2007/0067670 A1* | 3/2007 | Ebsen et al. | 714/7 |
| 2009/0300299 A1* | 12/2009 | Saxe et al. | 711/157 |

FOREIGN PATENT DOCUMENTS

| | | | |
|---|---|---|---|
| JP | 62-140153 | 6/1987 | |
| JP | 01-109453 | 4/1989 | |
| JP | 04-149653 | 5/1992 | |
| JP | 6-35798 | 2/1994 | |
| JP | 8-297588 | 11/1996 | |
| JP | 2724078 | 11/1997 | |
| JP | 2007-323251 A | * 12/2007 | G06F 3/06 |
| JP | 4213121 | 11/2008 | |
| WO | 2004/044754 | 5/2004 | |

OTHER PUBLICATIONS

International Search Report for corresponding International Application PCT/JP2009/001381; mailed Jul. 7, 2009.

* cited by examiner

*Primary Examiner* — Hal Schnee
(74) *Attorney, Agent, or Firm* — Staas & Halsey LLP

(57) ABSTRACT

A data processing apparatus includes a first memory that has first storage areas, a capacity of each first storage area being variable, a second memory that has second storage areas, a capacity of each second storage area being variable, and each second storage area is redundant to a first storage area corresponding to a second storage area, a memory controller that stores data stored in each first storage area to the corresponding second storage area, and writes data stored in a second storage area to the corresponding varied first storage area and writes data stored in a first storage area to the corresponding varied second storage area when capacities of the first storage area and the second storage areas are varied.

17 Claims, 4 Drawing Sheets

US 8,762,673 B2

INTERLEAVING DATA ACROSS CORRESPONDING STORAGE GROUPS

CROSS-REFERENCE TO RELATED APPLICATION

This application is a continuation application of International Application JP2009/001381 filed on Mar. 27, 2009 and designated the U.S., the entire contents of which are incorporated herein by reference.

FIELD

An aspect of the embodiment discussed herein is directed to a data processing apparatus, a method for controlling a memory control apparatus, a memory control apparatus and a method for controlling a memory control apparatus.

BACKGROUND

A server, one of data processing apparatus, has redundantly configured memories in some cases. Even if an error occurs on one of the redundantly configured memories, the server may thereby continue a process by using another regularly working memory. Some server accesses a memory by using an interleave function so as to achieve higher speed access to the memory. That is, the server divides data of consecutive addresses when the data is written into the memory, and puts a portion of the divided data on an interleave block of every way, i.e., one of areas into which the memory is divided. When the server reads data having been written, the server reads a plurality of portions of the data of the consecutive addresses put on the interleave blocks of the respective ways in parallel so as to achieve higher speed access to the memory. In such a case, a type of interleaving in case of dividing a memory into two interleave blocks is called 2-Way interleaving, and a type of interleaving in case of dividing a memory into four interleave blocks is called 4-Way interleaving.

In a case, however, where a server stores data in a memory on the basis of, e.g., a 2-Way interleave setting and then changes the 2-Way interleave setting to, e.g., a 4-Way interleave setting, an address that data is written into and an address that data is read from disagree with each other. Such disagreement results in that the data written into the memory and the data read from the memory do not match each other. Thus, if the server needs a change in an interleave setting because of, e.g., addition of a memory, the interleave setting is changed after the server stops working and after a process for rebooting the server.

SUMMARY

According to an aspect of an embodiment, a data processing apparatus includes a first memory that has first storage areas, a capacity of each first storage area being variable, a second memory that has second storage areas, a capacity of each second storage area being variable, and each second storage area is redundant to a first storage area corresponding to a second storage area, a memory controller that stores data stored in each first storage area to the corresponding second storage area, and writes data stored in a second storage area to the corresponding varied first storage area and writes data stored in a first storage area to the corresponding varied second storage area when capacities of the first storage area and the second storage areas are varied.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

According to the embodiment, a change in an interleave setting in a server 100 illustrated in FIG. 1 will be explained. The server 100 of the embodiment is configured to optimally change an interleave setting following addition of a memory without being rebooted. The server 100 of the embodiment has memory groups A 112 and 113 configured redundantly to each other, and interleaves the memory groups A 112 and 113 with each other for data access. How the server of the embodiment works will be explained below with reference to FIG. 1.

Figure 1:
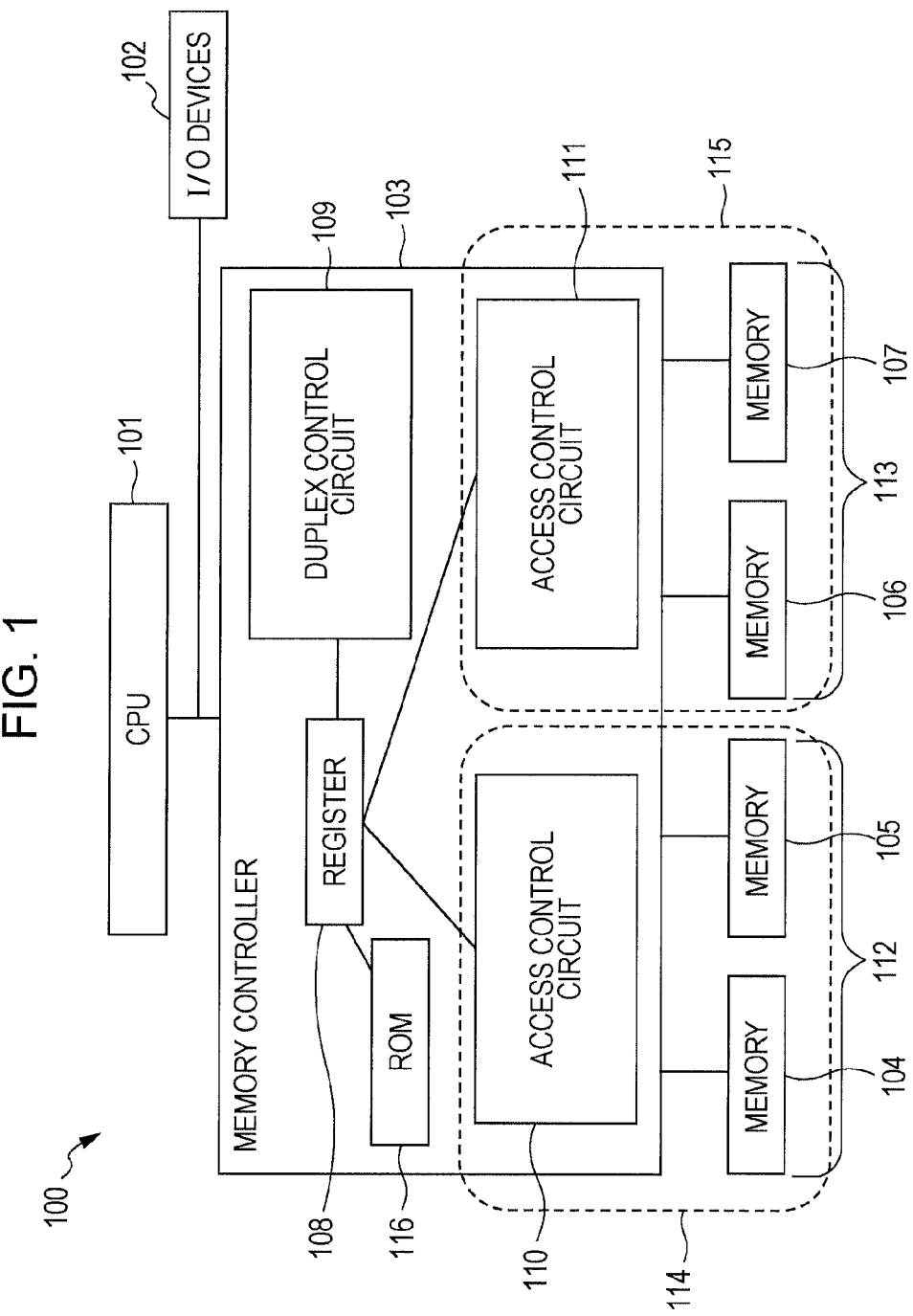
FIG. 1 is a hardware block diagram of a server of the embodiment.

FIG. 1 is a hardware block diagram of the server 100 of the embodiment. The server 100 is formed by a CPU (Central Processing Unit) 101, an I/O (Input/Output) device 102, a memory controller 103, memories 104, 105, 106 and 107, a register 108, a duplex control circuit 109, access control circuits 110 and 111, and a ROM (Read Only Memory) 116. The memories 104 and 105 form a memory group A 112, and the memories 106 and 107 form a memory group B 113. Further, the access control circuit 110 and the memory group A 112 form a storage circuit group A (Side A) 114, and the access control circuit 111 and the memory group B 113 form a storage circuit group B (Side B) 115. Then, the storage circuit group A 114 and the Side B 115 form a mirroring structure. That is, the server 100 has the memory groups A 112 and B 113 configured redundantly to each other.

The server 100 described here is rendered duplex between the memory group A 112 and the memory group B 113 so as to achieve high reliability. If a memory is added or extended to or removed from the one of the memory groups, another memory is added or extended to or removed from the other of the memory groups in a symmetrical manner so as to maintain the duplex formation.

Then, the server 100 stores data of consecutive addresses in the memory group A 112 by means of writing control using an interleaving process. Similarly, the server 100 redundantly stores the same data of the consecutive addresses in the memory group B 113 as well by means of writing control using the interleaving process. To put it more specifically, the access control circuit 110 writes or reads data of consecutive addresses into or from the memories 104 and 105 by using interleaving control so as to access the data. To interleave means here that the memory controller 103 divides data having consecutive addresses into every way, i.e., a certain divisional unit (e.g., a memory bank), and writes or reads the divided data into or from the way. In other words, the memories 104 and 105 are assigned consecutive memory addresses. Then, the memory controller 103 accesses for data to the consecutive addresses across a boundary between the memories 104 and 105. Similarly, the access control circuit 111 writes or reads data of consecutive addresses into or from the memories 106 and 107 by using interleaving control so as to access the data. That is, the memories 106 and 107 are assigned consecutive memory addresses, and the memory controller 103 accesses for data to the consecutive addresses across a boundary between the memories 106 and 107. The memory group A 112 and the memory group B of the embodiment are rendered duplex through mirroring. The server 100 stores same data in each of the memory 104 in the storage circuit group A and the memory 106 in the storage circuit group B, and so does in each of the memory 105 in the storage circuit group A and the memory 107 in the storage circuit group B. How the units that the server 100 has each work and function, and a procedure in that the server 100 resets an interleaving process will be explained below.

The CPU 101, an operation processing device, runs an operation process in the server 100. Actions carried out by the server 100 are to read or write data from or to the memories as instructed by a program run by the CPU 101 or as requested by a client device connected to the server 100, etc. The server 100 of the embodiment exchanges data with an external device such as a client device through the I/O device 102 such as a network controller. Then, the CPU 101 accesses the memories through the memory controller 103. The memory controller 103 reads data from the memories 104-107, and writes data into the memories 104-107.

Figure 2:
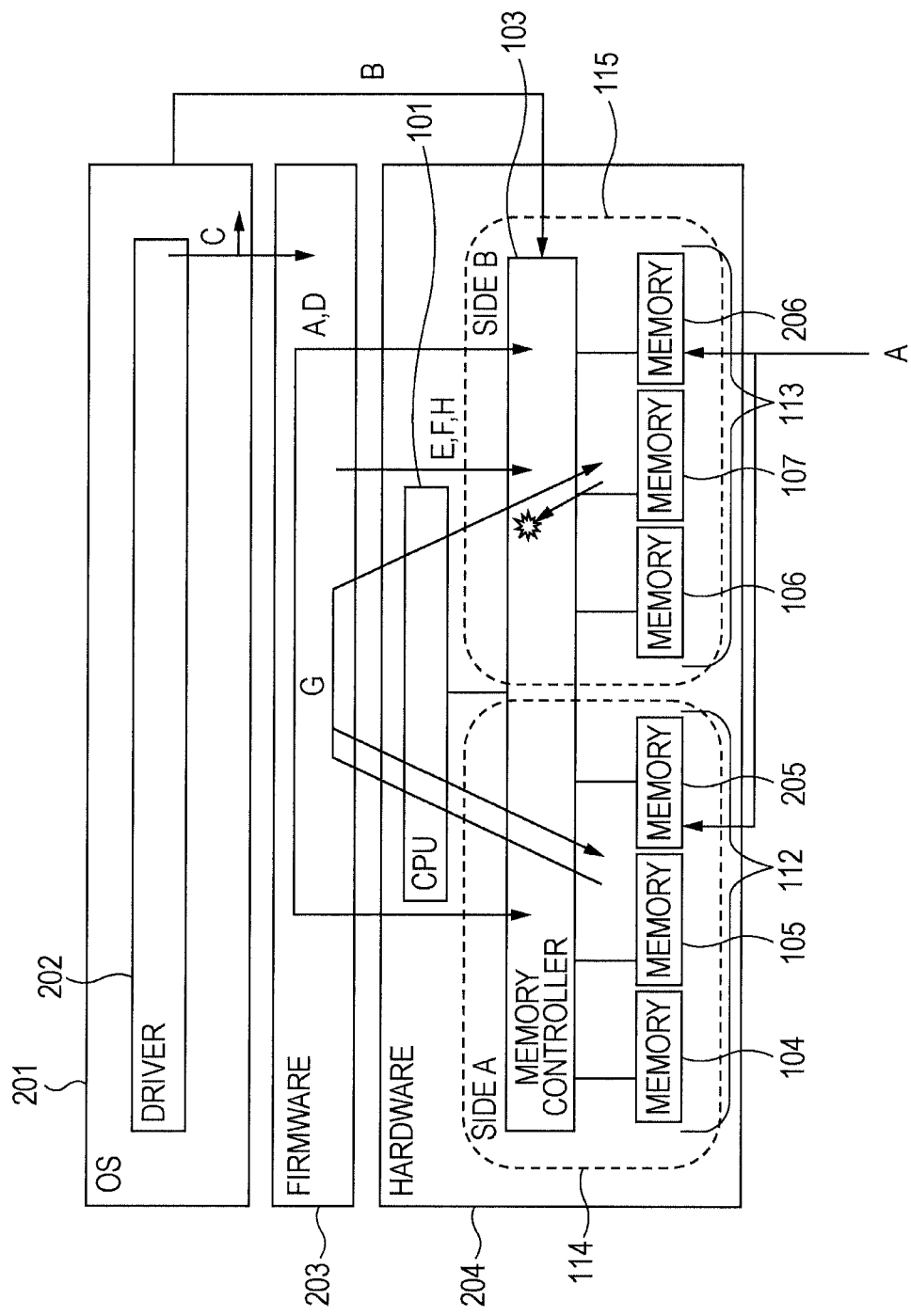
FIG. 2 is a schematic diagram for illustrating a change in an interleave setting in the server of the embodiment.

Then, in case of a change in an interleave setting, the CPU 101 controls the memory controller 103 in such a way that the memory controller 103 stops processing data by using the memories 104-107. To put it specifically, the CPU 101 sets the server 100 into sleep mode, and stops a transaction such as memory access done by an OS (Operating System) 201 illustrated in FIG. 2. When viewed from the aspect of software run on the server 100, a driver 202 illustrated in FIG. 2 is a software component having a function to stop a transaction of the OS 201, and the driver 202 stops a transaction of the OS 201. The term transaction mentioned here means a process including a set of several sessions run by the server 100 together. The term session means a unit of queries issued in a database management system when the server 100 updates a database, etc. as requested by the above client device, and a unit of responses to such queries. Further, the driver 202 is integrated in the OS 201.

Upon changing the interleave setting for the memories, e.g., from 2-Way to 3-Way, the CPU 101 restarts to process data by using the memories 104-107 and a new added memory.

The memory controller 103 has a register 108, a duplex control circuit 109, access control circuits 110 and 111 and a ROM 116.

The memory controller 103 has 1) a function to forbid access to the storage circuit group A 114 and the storage circuit group B 115 rendered duplex in a direction of reading. The memory controller 103 has 2) a function to stop working a function to check whether data read from each of the storage circuit group A 114 and the storage circuit group B 115 rendered duplex is identical with each other, as well. Further, the memory controller 103 has 3) a function to control the interleave setting between the storage circuit group A 114 and the storage circuit group B115 rendered duplex. Then, the memory controller 103 has 4) a function to release from the standstill as in above 2) and restart the function to check whether data read from each of the memory group A 114 and the memory group B 115 rendered duplex is identical with each other.

Further, a firmware unit 203 illustrated in FIG. 2 is stored in a ROM 116 included in the server 100 illustrated in FIG. 1. The firmware unit 203 integrates software into the server 100 for fundamental control such that a hardware framework 204 is booted or shut down, etc. The firmware unit 203 makes an interleave setting for the memory controller 103, runs a process for copying data in case of resetting the interleave setting (to write data into the memories 104-107), notifies the driver 202 that the copying process is finished, etc. The firmware unit 203 provides the memory controller 103 with software which works on the memory controller 103. That is, the process included in the firmware unit 203 is implemented by the memory controller 103 which runs the process.

The register 108 stores therein setting data that the memory controller 103 uses so as to run the process. That is setting data used by the firmware unit 203 including the process run by the memory controller 103. The duplex control circuit 109 and the access control circuits 110 and 111 run the process on the basis of the setting data. The duplex control circuit 109 checks agreement of data read from each of the memories 104 and 106 rendered duplex. Further, the duplex control circuit 109 checks agreement of data read from each of the memories 105 and 107 rendered duplex. Still further, the duplex control circuit 109 controls the storage circuit group A 114 and the storage circuit group B 115 so as to maintain the duplex configuration between them. The duplex control run by the duplex control circuit 109 is specifically control such that data stored in each of the memory group A 112 and the memory group B 113 is made identical with each other, and that, if data is written into the memory group A 112 by the use of the interleaving control, the identical data is written into the memory group B 113 by the use of the interleaving control as well. The access control circuit 110 of the storage circuit group A 114 controls access to data in the memories 104 and 105, and the access control circuit 111 of the storage circuit group B 115 controls access to data in the memories 106 and 107. The access control circuit 110 specifically stores therein setting data related to the interleave setting to the memories 104 and 105 and a setting for reading/writing. The access control circuit 111 stores therein setting data related to the interleave setting to the memories 106 and 107 and a setting for reading/writing. The setting data related to the interleave setting and the setting for reading/writing may be stored in the register 108. Then, the access control circuit 110 may read the setting data related to the interleave setting to the memories 104 and 105 and the setting for reading/writing from the register 108, and the access control circuit 111 may read the setting data related to the interleave setting to the memories 106 and 107 and the setting for reading/writing from the register 108.

If new memories are added to the memory groups A 112 and B 113 of the server 100, the memory controller 103 of the embodiment alternately changes the interleave settings to the storage circuit groups A 114 and B 115 in a state after the CPU 101 stops a transaction of the OS 201. More specifically, if new memories are added to the memory groups A 112 and B 113, the memory controller 103 erases data to be stored into the memory group A 112. Then, the memory controller 103 writes data stored in the memory group B 113 into the memory group A 112 that a new memory has been added to in accordance with a change in the number of the memories through a new interleave setting. The memory controller 103, e.g., writes data stored in the memory group B 113 through a 2-Way interleave setting into the memory group A 112 through a new 3-Way interleave setting. Still further, the memory controller 103 erases data to be stored in the memory group B 113, and writes data stored in the memory group A 112 into the memory group B 113 that a new memory has been added to in accordance with a change in the number of the memories through a new interleave setting. The memory controller 103, e.g., writes data stored in the memory group A 112 through a 3-Way interleave setting into the memory group B 113 through a new 3-Way interleave setting. The memory controller 103 resets the interleave setting in the server 100 in this way by writing data stored in the memory group A 112 into the memory group B 113 by using a new interleave setting. The memory controller 103 resets the interleave setting in accordance with a change in the number of the memories, specifically by dividing data in accordance with the added number of the memories and stores the divided data in the memories by using a new interleave setting upon increasing the memories, and by dividing data in accordance with the reduced number of the memories and stores the divided data in the memories by using a new interleave setting upon decreasing the memories.

Figure 3:
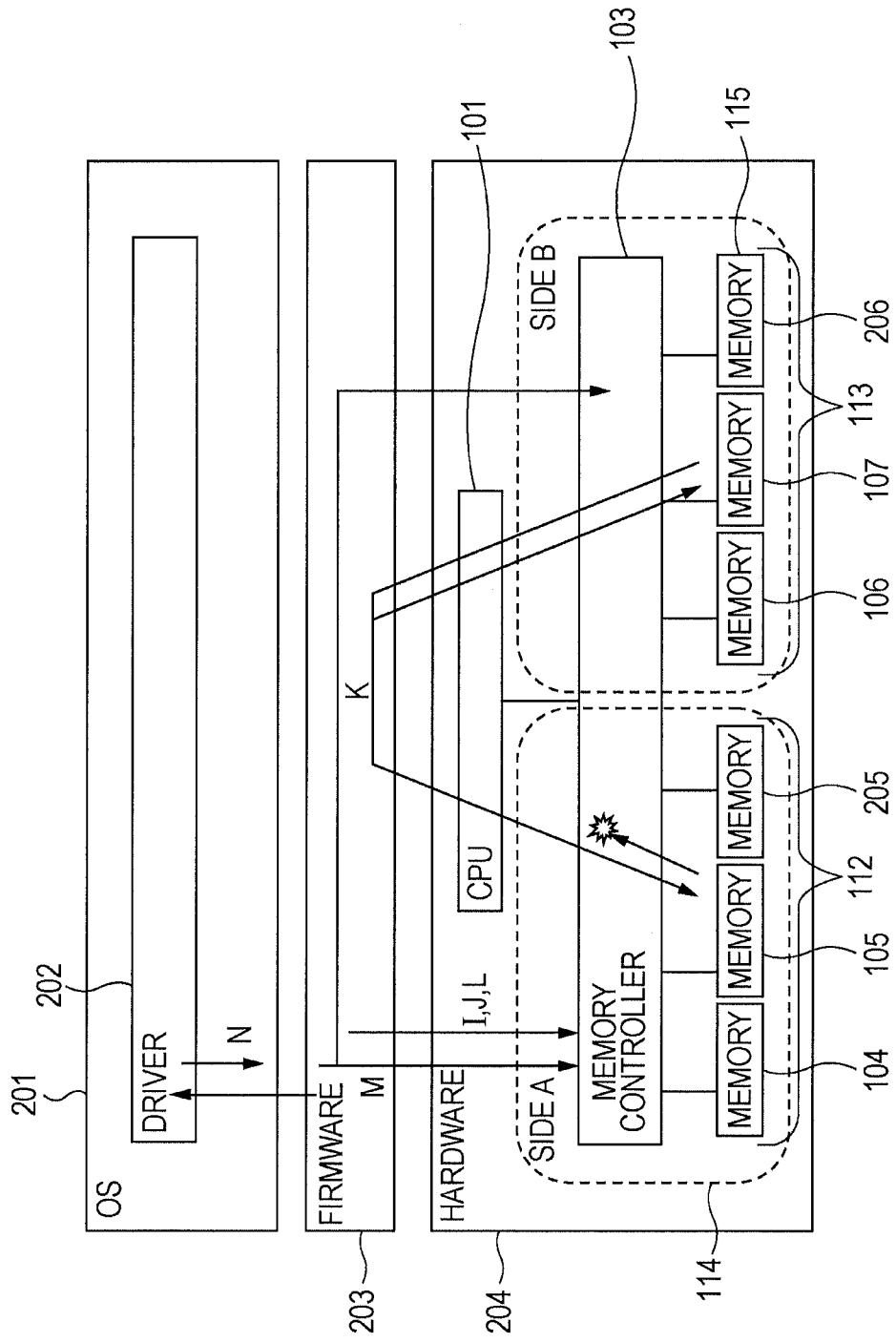
FIG. 3 is a schematic diagram for illustrating a change in an interleave setting in the server of the embodiment.

FIGS. 2 and 3 are schematic diagrams for illustrating a change in an interleave setting in the server 100 of the embodiment. FIG. 2 is a block diagram for illustrating the OS 201, the driver 202 and the firmware unit 203 which work on the server 100 and the hardware framework 204 which forms the server 100. The hardware framework 204 includes the CPU 101, the memory controller 103 and the memories 104-107.

FIG. 2 illustrates a state in which memories 205 and 206 are added to the server 100 and then an interleave setting is completed in the storage circuit group B 115 rendered duplex. Further, FIG. 3 illustrates a state in which an interleave setting is completed in the Side A 114, the other one of the duplex. According to the embodiment, a case where the memories 205 and 206 are added to the server 100 so that the interleave setting is changed from a 2-Way interleave setting to a 3-Way interleave setting will be explained. The term n-Way interleave setting means a setting such that data of consecutive addresses is divided by n and is written or read into or from n-memories. Further, as described above, the driver 202 is implemented by software run on the CPU 101, and the firmware unit 203 is implemented by software run on the memory controller 103. Thus, procedure in which the driver 202 carries out a process is implemented by the CPU 101 running the driver 202, and a procedure in which the firmware unit 203 carries out a process is implemented by the memory controller 103 running the firmware unit 203.

The memories 205 and 206 are added to the server 100 at first. If the memories 205 and 206 are added to the storage circuit group A 114 and to the storage circuit group B 115, respectively, the firmware unit 203 and the memory controller 103 recognizes and initializes the added memories 205 and 206 (step A). Upon receiving a piece of information of the added memories 205 and 206 from the firmware unit 203 and the memory controller 103, the OS 201 recognizes the memories 205 and 206 as portions in the hardware framework 204 (step B).

The driver 202 stops a transaction of the OS 201 in operation so as to change interleave settings in the storage circuit groups A 114 and B 115, and notifies the firmware unit 203 that the transaction has been stopped (step C). The driver 202 sets the server 100 into sleep mode, and stops transactions of the OS 201 including memory access.

The firmware unit 203 stops a check on agreement of data read from the memories 104-107, 205 and 206 (step D). The firmware unit 203 forbids the memory controller 103 from accessing the storage circuit group B 115 in a direction of reading (step E). The firmware unit 203 sets an optimum interleave setting to the storage circuit group B 115 to which Read access has been forbidden (step F). The optimum interleave setting of the embodiment is a 3-Way interleave setting due to the addition of the memory 206. As the firmware unit 203 has changed the interleave setting in the storage circuit group B 115 from the 2-Way interleave setting to the 3-Way interleave setting, it looks to the CPU 101 as if an address of data accessed on the memory is changed. Thus, data stored in the storage circuit group B 115 and stored in an address after the change in the interleave setting looks to the OS 201, the firmware unit 203 and the driver 202 like data different from data before the change in the interleave setting.

The firmware unit 203 copies data stored in the storage circuit group A 114 into the storage circuit group B 115 having been changed to the 3-Way interleave setting (step G). Upon completing the process for copying the data in the storage circuit group A 114 into the storage circuit group B 115, the firmware unit 203 lifts the forbidden access to read data from the storage circuit group B 115 (step H).

Then, the firmware unit 203 forbids the storage circuit group A 114, the side on which the interleave setting has not been changed, from being accessed in a direction of reading (step I). The firmware unit 203 shifts the storage circuit group A 114 for which reading access has been forbidden from the 2-Way interleave setting into the 3-Way interleave setting (step J).

The firmware unit 203 copies data stored in the storage circuit group B 115 into the storage circuit group A 114 (step K). Upon completing the process for copying the data in the storage circuit group B 115 into the storage circuit group A 114, the firmware unit 203 lifts the forbidden access to read data from the storage circuit group A 114 (step L).

The firmware unit 203 restarts a check on agreement of data read from the memories 104-107, 205 and 206 rendered duplex to the memory controller 103 (step M). The firmware unit 203 notifies the driver 202 that the process for changing the interleave setting is finished, and the driver 202 requests the OS 201 to restart a transaction including memory access (step N).

Figure 4:
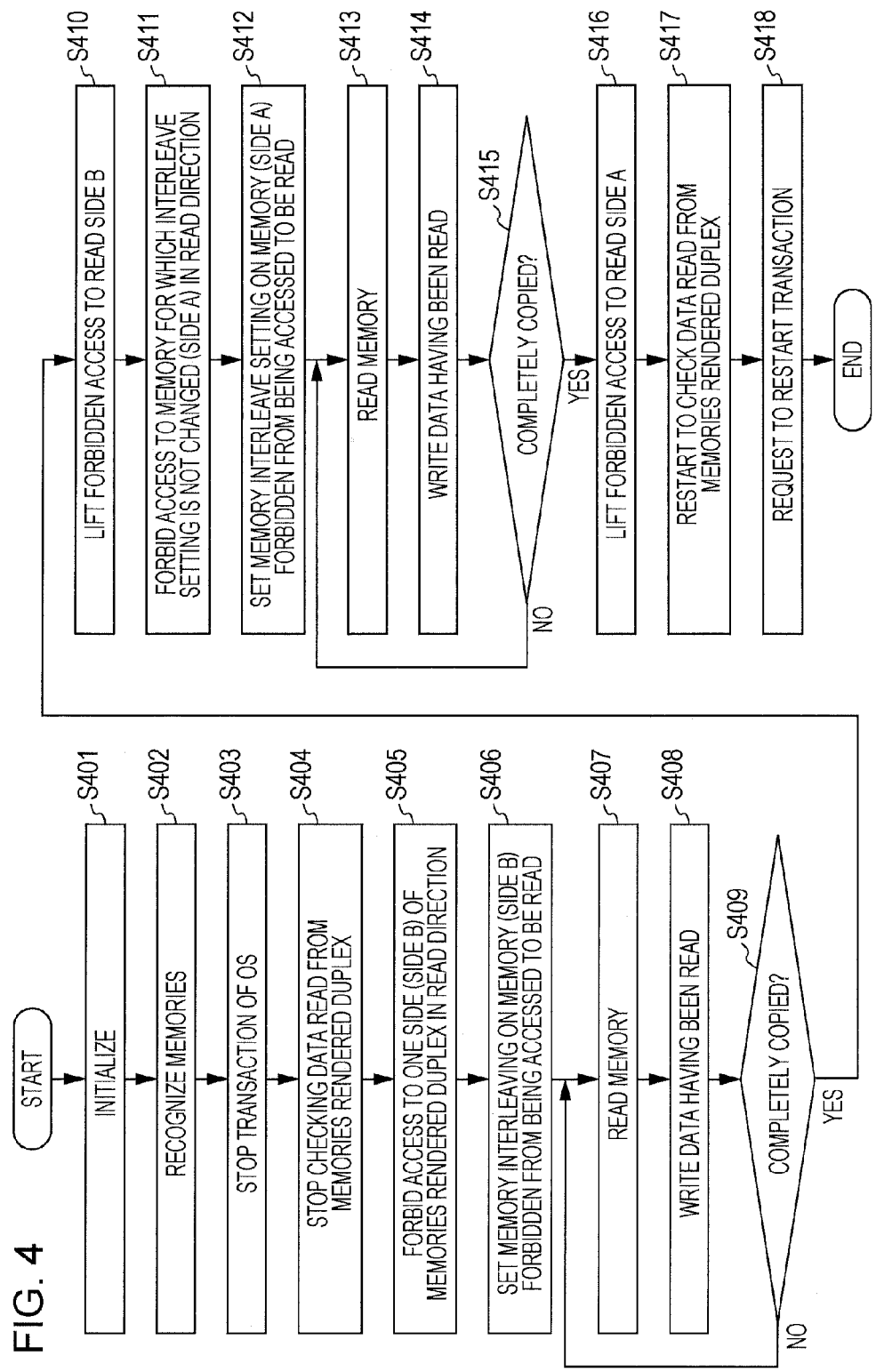
FIG. 4 is a flowchart of an interleave setting in the server of the embodiment.

FIG. 4 is a flowchart of an interleave setting in the server 100 of the embodiment. A change in the interleave setting done by the server 100 will be explained in more detail by the use of the flowchart illustrated in FIG. 4.

If the memories 205 and 206 are added to the storage circuit group A 114 and the storage circuit group B 115, respectively, the firmware unit 203 and the memory controller 103 recognizes and initializes the added memories 205 and 206 (step S401). Upon receiving a piece of information related to the added memories 205 and 206, i.e., related to their storage capacity, the OS 201 recognizes the memories 205 and 206 (step S402).

The driver 202 stops a transaction of the OS 201 in operation including memory access, and notifies the firmware unit 203 that the transaction is stopped (step S403). As the interleave setting for the storage circuit groups A 114 and B 115 is changed from a 2-Way interleave setting to a 3-Way interleave setting, the CPU 101 stops a transaction of the OS 201 in terms of hardware operation. In other words, the CPU 101 stops a transaction of the OS 201, so that data stored in the storage circuit groups A 114 and B 115 is settled and that the memory controller 103 changes the interleave setting for the storage circuit groups A 114 and B 115 from a 2-Way interleave setting to a 3-Way interleave setting. The CPU 101 stops processing data by using the storage circuit groups A 114 and B 115 so as to settle the data stored in the storage circuit groups A 114 and B 115.

The firmware unit 203 stops checking agreement of data read from the memories 104-107, 205 and 206 (step S404).

The duplex control circuit 109 checks agreement of data read from the memories 104-107, 205 and 206. The firmware unit 203 instructs the duplex control circuit 109 to stop checking agreement of data read from the memories 104-107, 205 and 206.

At a next step S405, the firmware unit 203 forbids data in the storage circuit group B from being read before a change in the interleave setting in the server 100. The memory controller 103 may read data from the memory group A 112 but not from the memory group B 113 in this state where reading data is forbidden, and data read from each of the memory groups A 112 and B 113 rendered duplex differs from each other. As the duplex control circuit 109 does not detect this state as a hardware failure, the firmware unit 203 stops checking agreement of data read from the memories 104-107, 205 and 206 on the duplex control circuit 109.

The firmware unit 203 forbids the memory controller 103 from accessing the storage circuit group B 115 in a direction of reading (step S405). To put it more specifically, the access control circuit 110 controls access to data in the memories 104, 105 and 205, and the access control circuit 111 controls access to data in the memories 106, 107 and 206. Thus, the firmware unit 203 sets the access control circuit 111 to be forbidden from accessing data in the memories 106, 107 and 206. The firmware unit 203 changes the interleave setting for the storage circuit group B 115 forbidden from being accessed in the direction of reading from a 2-Way interleave setting to a 3-Way interleave setting (step S406). To put it more specifically, the firmware unit 203 sets the access control circuit 111 of the storage circuit group B 115 from a 2-Way interleave setting into a 3-Way interleave setting.

The firmware unit 203 tries to read data from the memories 104-107. Because reading data from the storage circuit group B 115 is forbidden, the firmware unit 203 consequently reads data only from the memories 104 and 105 of the storage circuit group A 114 (step S407). The data that the firmware unit 203 reads from the memories 104 and 105 is data at a time when the transaction of the OS 201 is stopped.

The firmware unit 203 writes the data read from the memories 104 and 105 of the storage circuit group A 114 into the memories 106, 107 and 206 of the storage circuit group B 115 (step S408). As having set the storage circuit group B 115 into a 3-Way interleave setting at the step S406, the firmware unit 203 writes the data into the memories 106, 107 and 206 through the 3-Way interleave setting. Incidentally, the access control circuits 110 and 111 are set to "enabled to write" as to a setting for data writing. Thus, the firmware unit 203 carries out a process for writing data stored in the storage circuit group A 114 into both of the sides, the storage circuit groups A 114 and B 115. The server 100 may let the firmware unit 203 write the data in the storage circuit group A 114 into the storage circuit group B 115 only as a matter of course.

The firmware unit 203 identifies whether the data in the storage circuit group A 114 has been completely copied into the storage circuit group B 115 (step S409). Upon identifying the data in the storage circuit group A 114 as not having been completely written into the storage circuit group B 115 (step S409 No), the firmware unit 203 reads data from the memories 104 and 105 of the storage circuit group A 114 again, and writes the data into the memories 106, 107 and 206 of the storage circuit group B 115 through the 3-Way interleave setting (steps S407 and S408).

Upon identifying the data in the storage circuit group A 114 as having been completely copied into the storage circuit group B 115 (step S409 Yes), the firmware unit 203 lifts the forbidden access to read data from the storage circuit group B 115 (step S410). The firmware unit 203 may identify whether the copy is correctly finished after finishing the data copy, and so may the hardware framework 204.

Then, the firmware unit 203 forbids the storage circuit group A 114, the side on which the interleave setting remains without being changed, from being accessed in a direction of reading (step S411). To put it more specifically, the firmware unit 203 forbids the access control circuit 110 from accessing data in the memories 104, 105 and 205. The firmware unit 203 shifts the storage circuit group A 114 for which reading access has been forbidden from the 2-Way interleave setting to the 3-Way interleave setting (step S412). The firmware unit 203 reads data from the memories 106, 107 and 206 of the storage circuit group B 115 (step S413). The firmware unit 203 tries to read data from the memories 104-107, 205 and 206. As reading data from the storage circuit group A 114 is forbidden, the firmware unit 203 consequently reads data only from the memories 106, 107 and 206 of the storage circuit group B 115.

The firmware unit 203 writes the data read from the memories 106, 107 and 206 of the storage circuit group B 115 into the memories 104, 105 and 205 of the storage circuit group A 114 (step S414). As having set the storage circuit group A 114 into a 3-Way interleave setting at the step S412, the firmware unit 203 writes the data into the memories 104, 105 and 205 through the 3-Way interleave setting.

The firmware unit 203 identifies whether the data in the storage circuit group B 115 has been completely copied into the storage circuit group A 114 (step S415). Upon identifying the data in the storage circuit group B 115 as not having been completely written into the storage circuit group A 114 (step S415 No), the firmware unit 203 reads data from the memories 106, 107 and 206 of the storage circuit group B 115 again, and writes the data into the memories 104, 105 and 205 of the storage circuit group A 114 through the 3-Way interleave setting (steps S413 and S414).

Upon identifying the data in the storage circuit group B 115 as having been completely copied into the storage circuit group A 114 (step S415 Yes), the firmware unit 203 lifts the forbidden access to read data from the storage circuit group A 114 (step S416). The firmware unit 203 may identify whether the data has been correctly written after finishing writing the data at this time as well, and so may the hardware framework 204. The firmware unit 203 may identify whether the data stored in each of the memory group A 112 and the memory group B 113 agrees with each other after resetting the interleave settings of the memory group A 112 (the memories 104, 105 and 205) and the memory group B 113 (the memories 106, 107 and 206).

The firmware unit 203 restarts a check on agreement of data read from the memories 104-107, 205 and 206 (step S417). The firmware unit 203 notifies the driver 202 that the process for changing the interleave setting is finished, and the driver 202 requests the OS 201 to restart a transaction (step S418). The CPU 101 restarts a transaction including memory access in response to the request for the restart of the transaction from the driver 202 to the OS 201. That is, the server 100 returns from the sleep mode and restarts to process data by using the memories 104-107, 205 and 206.

According to the embodiment, a server may alternately change an interleave setting for redundantly configured memories so as to optimally change the interleave setting without a need to be rebooted. That is, the server 100 of the embodiment uses the function for rendering the memories duplex and the controls of hardware, software and drivers, so as to solve a problem in that written data does not match read data in case of an interleave setting without being rebooted. As a result, the server 100 may quickly reset an interleave setting even in case of an addition of a memory, so as to enhance a bandwidth for memory access.

The server of the embodiment resets an interleave setting without being rebooted. Thus, the server of the embodiment is quite useful for providing a server which expands a system.

All examples and conditional language recited herein are intended for pedagogical purposes to aid the reader in understanding the embodiment and the concepts contributed by the inventor to furthering the art, and are to be construed as being without limitation to such specifically recited examples and conditions, nor does the organization of such examples in the specification relate to a illustrating of the superiority and inferiority of the embodiment. Although the embodiment has been described in detail, it should be understood that the various changes, substitutions, and alterations could be made hereto without departing from the spirit and scope of the invention.

What is claimed is:

1. A data processing apparatus comprising:
    a first group of storage areas having data interleaved across the first group of storage areas;
    a second group of storage areas having a mirrored correspondence with the first group of storage areas having data interleaved across the second group of storage areas;
    a memory controller that reads data from the first group of storage areas when a change is made to the first group of storage areas, selectively writes the data to the second group of storage areas so the data is interleaved across the storage areas of the second group accounting for a change of the second group of storage areas which mirrors the changed first group of storage areas, and interleaves data read from the second group of storage areas across the first group of storage areas in accordance with the change to the first group of storage areas.

2. The data processing apparatus according to claim 1, wherein the mirrored correspondence between the first group of storage areas and the second group of storage areas is maintained after a change in capacity to the first group of storage areas.

3. The data processing apparatus according to claim 2, wherein after the change to the first group of storage areas, the memory controller forbids data from being read from the first group of storage areas until the data from the second group of storage areas is written into the first group of storage areas, and
    forbids data from being read from the second group of storage areas until the data from the first group of storage areas is written into the second group of storage areas.

4. The data processing apparatus according to claim 3, wherein
    the memory controller suspends processing data used by the first group of storage areas and the second group of storage areas to settle data stored in each storage area, respectively.

5. The data processing apparatus according to claim 4, wherein
    data processing is restarted after the data is updated in the first group and the second group of storage areas.

6. The data processing apparatus according to claim 4, wherein
    the memory controller determines whether data written maintains a mirrored correspondence between the first group and the second group of storage areas.

7. The data processing apparatus according to claim 1, wherein each storage area of the second group of storage areas is a redundant storage area of a storage area in the first group of storage areas.

8. The data processing apparatus according to claim 1, wherein data is written without restarting the data processing apparatus.

9. The data processing apparatus according to claim 1, wherein a new interleave processing is performed.

10. The data processing apparatus according to claim 1, wherein an interleave processing changes an existing interleave configuration.

11. A method to control a data processing apparatus, comprising:
    reading data from a first group of storage areas, having data interleaved across the first group of storage areas, when a capacity of the first group of storage areas is changed;
    selectively writing the data to a second group of storage areas, having data interleaved across the second group of storage areas and a mirrored correspondence with the first group of storage areas, so the data is interleaved across the storage areas of the second group accounting for a change to the second group of storage areas mirroring the change to the first group of storage areas; and
    interleaving data read from the second group of storage areas to the first group of storage areas in accordance with the change to the first group of storage areas.

12. The method according to claim 11, wherein each storage areas of the second group of storage areas is a redundant storage area of a storage area in the first group of storage areas.

13. The method according to claim 11, wherein data is written without restarting the data processing apparatus.

14. A memory control apparatus connected to a first memory group that divides and stores data in a plurality of first memories, and a second memory group that divides and stores data in a plurality of second memories having a mirrored correspondence with the plurality of first memories, the memory control apparatus comprising:
    a processor configured to:
        read data from the first memory group, having data interleaved across the plurality of first memories, when a capacity of the first memory group is changed,
        write the data to a second memory group, having data interleaved across the plurality of second memories so the data is interleaved across the second memory group accounting for a change of the plurality of second memories mirroring the changed first memory group, and
        interleaving data read from the second memory group to the first memory group in accordance with the changed plurality of first memories.

15. The memory control apparatus according to claim 14, wherein,
    the data divided and stored in the second memory group is read after the capacity of the second memory group is changed, and
    the data divided and stored in the first group is read after the capacity of the first memory group is changed.

16. The memory control apparatus according to claim 14, wherein each of the memories of the second memory group is a redundant storage of a corresponding memory in the first memory group.

17. The memory control apparatus according to claim 14, wherein the data is written without restarting the memory control apparatus.

* * * * *